(12) United States Patent
Kadu et al.

(10) Patent No.: US 12,190,587 B2
(45) Date of Patent: Jan. 7, 2025

(54) RECURSIVE SEGMENT TO SCENE SEGMENTATION FOR CLOUD-BASED CODING OF HDR VIDEO

(71) Applicant: Dolby Laboratories Licensing Corporation, San Francisco, CA (US)

(72) Inventors: Harshad Kadu, Santa Clara, CA (US); Guan-Ming Su, Fremont, CA (US); Neeraj J. Gadgil, Pune (IN); Tsung-Wei Huang, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 52 days.

(21) Appl. No.: 18/044,771

(22) PCT Filed: Sep. 17, 2021

(86) PCT No.: PCT/US2021/050838
§ 371 (c)(1),
(2) Date: Mar. 9, 2023

(87) PCT Pub. No.: WO2022/061089
PCT Pub. Date: Mar. 24, 2022

(65) Prior Publication Data
US 2023/0343100 A1   Oct. 26, 2023

Related U.S. Application Data

(60) Provisional application No. 63/080,255, filed on Sep. 18, 2020.

(30) Foreign Application Priority Data

Sep. 18, 2020   (EP) ..................................... 20196876

(51) Int. Cl.
G06V 20/40   (2022.01)
G06T 5/40   (2006.01)
(Continued)

(52) U.S. Cl.
CPC ................ G06V 20/49 (2022.01); G06T 5/40 (2013.01); H04N 19/142 (2014.11); H04N 19/192 (2014.11); H04N 19/98 (2014.11)

(58) Field of Classification Search
CPC .... H04N 19/117; H04N 19/127; H04N 19/85; H04N 19/192; H04N 19/33;
(Continued)

(56) References Cited

U.S. PATENT DOCUMENTS 8,593,480 B1   11/2013   Ballestad
8,811,490 B2   8/2014   Su
(Continued)

FOREIGN PATENT DOCUMENTS

EP   3306563 B1   1/2022
WO   2018005705 A1   1/2018
(Continued)

OTHER PUBLICATIONS

Nithya Manickam et. al., "Reducing False Positives in Video Shot Detection Using Learning Techniques", Jan. 1, 2007, Computer Vision, Graphics and Image Processing Lecture Notes in Computer Science, Springer, Berlin, pp. 421-432.
(Continued)

*Primary Examiner* — Thai Q Tran
*Assistant Examiner* — Nienru Yang

(57) ABSTRACT

In a cloud-based system for encoding high dynamic range (HDR) video, each node receives a video segment and bumper frames. Each segment is subdivided into primary scenes and secondary scenes to derive scene-based forward reshaping functions that minimize the amount of reshaping-related metadata when coding the video segment, while maintaining temporal continuity among scenes processed by multiple nodes. Methods to generate scene-based forward and backward reshaping functions to optimize video coding and improve the coding efficiency of reshaping-related metadata are also examined.

13 Claims, 5 Drawing Sheets

(51) Int. Cl.
*H04N 19/142* (2014.01)
*H04N 19/192* (2014.01)
*H04N 19/98* (2014.01)

(58) Field of Classification Search
CPC .... H04N 19/436; H04N 19/142; H04N 19/98; H04N 21/44; H04N 21/44012; H04N 21/47217; G06V 20/49; G06T 5/40; G11B 27/00; G11B 27/002
USPC .......................................................... 386/241
See application file for complete search history.

(56) References Cited

U.S. PATENT DOCUMENTS

| | | | |
|---|---|---|---|
| 10,264,287 | B2 | 4/2019 | Wen |
| 10,397,576 | B2* | 8/2019 | Kadu ................... H04N 9/67 |
| 10,575,028 | B2 | 2/2020 | Kadu |
| 10,609,372 | B2* | 3/2020 | Su ...................... H04N 19/117 |
| 2018/0007356 | A1 | 1/2018 | Kadu |
| 2018/0098094 | A1 | 4/2018 | Wen |
| 2019/0199989 | A1* | 6/2019 | Li ........................ H04N 9/646 |
| 2019/0272643 | A1* | 9/2019 | Gadgil ..................... G06T 7/11 |
| 2019/0349607 | A1 | 11/2019 | Kadu |
| 2020/0267392 | A1* | 8/2020 | Lu ......................... H04N 19/82 |

FOREIGN PATENT DOCUMENTS

| | | |
|---|---|---|
| WO | 2018049335 A1 | 3/2018 |
| WO | 2019217751 A1 | 11/2019 |
| WO | 2022011194 A1 | 1/2022 |
| WO | 2023022956 A1 | 2/2023 |

OTHER PUBLICATIONS

Yazdi Mehran et. al., "Shot Boundary Detection with Effective Prediction of Transitions' Positions and Spans by use of Classifiers and Adaptive Thresholds", 2016 24th Iranian Conference on Electrical Engineering (ICEE), IEEE, May 10, 2016, pp. 167-172.

* cited by examiner

RECURSIVE SEGMENT TO SCENE SEGMENTATION FOR CLOUD-BASED CODING OF HDR VIDEO

CROSS-REFERENCE TO RELATED APPLICATIONS

This application is a U.S. National Stage of International Application No. PCT/US2021/050838, filed Sep. 17, 2021, which claims the benefit of priority from U.S. Provisional Patent Application 63/080,255, filed on 18 Sep. 2020, and European Patent Application 20196876.5, filed on 18 Sep. 2020, which are hereby incorporated by reference.

TECHNOLOGY

The present disclosure relates generally to images. More particularly, an embodiment of the present invention relates to recursive video segment to scenes segmentation for processing HDR video in cloud-based coding architectures.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). For example, using gamma luminance coding, images where n≤8 (e.g., color 24-bit JPEG images) are considered images of standard dynamic range, while images where n≥10 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 $cd/m^2$ or nits. Most consumer HDTVs range from 300 to 500 nits with new models reaching 1,000 nits ($cd/m^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

As used herein, the term "forward reshaping" denotes a process of sample-to-sample or codeword-to-codeword mapping of a digital image from its original bit depth and original codewords distribution or representation (e.g., gamma, PQ, HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the received signal (which may or may not be reshaped), the receiver may apply an "inverse (or backward) reshaping function" to restore the signal to its original codeword distribution and/or to achieve a higher dynamic range.

In many video-distribution scenarios, HDR video may be coded in a multi-processor environment, typically referred to as a "cloud computing server." In such an environment, trade-offs among ease of computing, workload balance among the computing nodes, and video quality, may force reshaping-related metadata to be updated on a frame-by-frame basis, which may result in unacceptable overhead, especially when transmitting video at low bit rates. As appreciated by the inventors here, improved techniques for segment to scene segmentation to minimize the overhead of reshaping-related metadata in a cloud-based environment are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods for scene segmentation and node-based processing in cloud-based video coding of HDR video are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to cloud-based reshaping and coding for HDR images. In an embodiment, in a cloud-based system for encoding HDR video, a current node receives a first video sequence comprising video frames in a high dynamic range. Then, one or more processors in the node:
- generate for each video frame in the first video sequence a frame-based forward reshaping function, wherein a forward reshaping function maps frame pixels from the high dynamic range to a second dynamic range lower than the high dynamic range;
- generate a set of primary scenes for the first video sequence;
- generate a second set of scenes for the first video sequence based on the set of primary scenes, secondary scenes derived from one or more primary scenes, and the frame-based forward reshaping functions;
- generate scene-based forward reshaping functions based on the second set of scenes;
- apply the scene-based forward reshaping functions to the first video sequence to generate an output video sequence in the second dynamic range; and
- compress the output video sequence to generate a coded bitstream in the second dynamic range, wherein, given a primary scene, generating a list of secondary scenes for the primary scene comprises:
  - initializing a set of secondary scenes and a set of violation scenes based on the set of primary scenes;
  - generating one or more sets of smoothness thresholds based on the frame-based forward reshaping functions; and
  - repeating until there are no boundary violations:
    - dividing each scene in the set of violation scenes into two new subscenes;
    - generating an updated set of violation scenes with an empty set;
    - generating an updated set of secondary scenes by adding the new subscenes to the set of secondary scenes;
    - performing one or more boundary violation checks in the set of secondary scenes using the one or more sets of smoothness thresholds; and
    - if there is at least one boundary violation between two subscenes in the set of secondary scenes, then adding the two subscenes to the set of violation scenes and continuing subdividing the primary scene with the updated set of violation scenes and the updated set of secondary scenes;
    - else, signaling there are no boundary violations and outputting the list of secondary scenes.

Example HDR Coding System

Figure 1A:
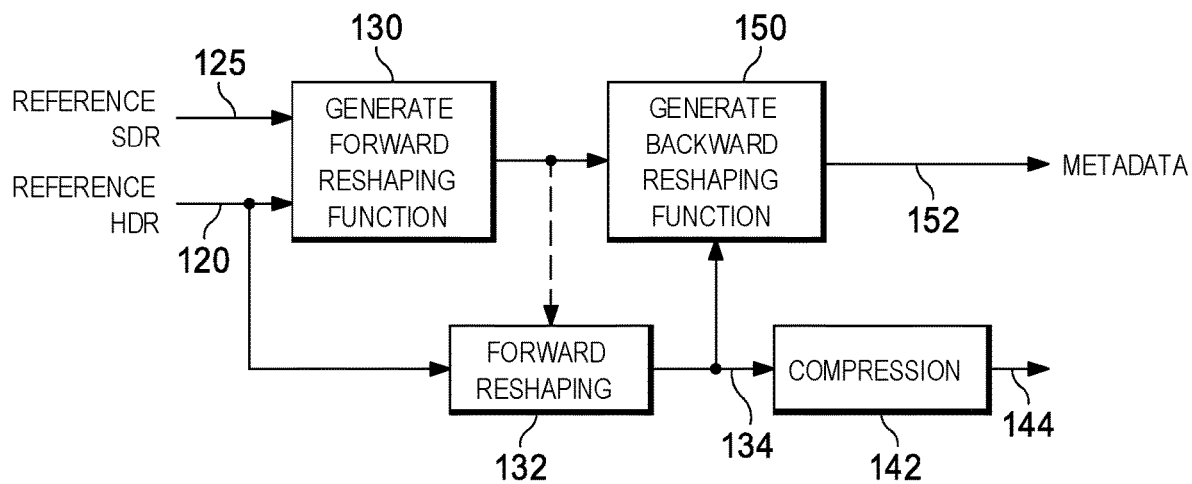
FIG. 1A depicts an example single-layer encoder for HDR data using a reshaping function according to prior art.
Figure 1B:
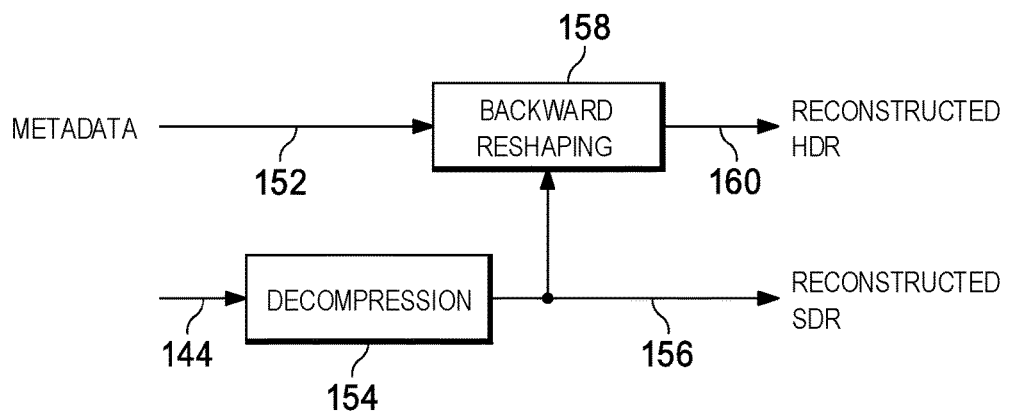
FIG. 1B depicts an example HDR decoder corresponding to the encoder of FIG. 1A, according to prior art.

FIG. 1A and FIG. 1B illustrate according to prior art an example single-layer backward-compatible codec framework using image reshaping. More specifically, FIG. 1A illustrates an example encoder architecture, which may be implemented with one or more computing processors in an upstream video encoder. FIG. 1B illustrates an example decoder architecture, which may also be implemented with one or more computing processors in one or more downstream video decoders.

Under this framework, given reference HDR content (120) and corresponding reference SDR content (125) (that is, content that represents the same images as the HDR content, but color-graded and represented in standard dynamic range), reshaped SDR content (134) is encoded and transmitted as SDR content in a single layer of a coded video signal (144) by an upstream encoding device that implements the encoder architecture. The received SDR content is received and decoded, in the single layer of the video signal, by a downstream decoding device that implements the decoder architecture. Backward-reshaping metadata (152) is also encoded and transmitted in the video signal with the reshaped content so that HDR display devices can reconstruct HDR content based on the (reshaped) SDR content and the backward reshaping metadata. Without loss of generality, in some embodiments, as in non-backward-compatible systems, reshaped SDR content may not be watchable on its own, but must be watched in combination with the backward reshaping function, which will generate watchable SDR or HDR content. In other embodiments which support backward compatibility, legacy SDR decoders can still playback the received SDR content without employing the backward reshaping function.

As illustrated in FIG. 1A, given HDR image (120) and SDR image (125), and a target dynamic range, step 130 generates a forward reshaping function. Given the generated forward reshaping function, a forward reshaping mapping step (132) is applied to the HDR images (120) to generate reshaped SDR base layer (134). A compression block (142) (e.g., an encoder implemented according to any known video coding algorithms, like AVC, HEVC, AV1, and the like) compresses/encodes the SDR images (134) in a single layer (144) of a video signal. In addition, a backward reshaping function generator (150) may generate a backward reshaping function which may be transmitted to a decoder as metadata (152). In some embodiments, metadata (152) may represent the forward reshaping function (130), thus, it would be up to the decoder to generate the backward reshaping function (not shown).

Examples of backward reshaping metadata representing/specifying the optimal backward reshaping functions may include, but are not necessarily limited to only, any of: an inverse tone mapping function, inverse luma mapping functions, inverse chroma mapping functions, lookup tables (LUTs), polynomials, inverse display management coefficients/parameters, etc. In various embodiments, luma backward reshaping functions and chroma backward reshaping functions may be derived/optimized jointly or separately, may be derived using a variety of techniques, for example, and without limitation, as described later in this disclosure.

The backward reshaping metadata (152), as generated by the backward reshaping function generator (150) based on the reshaped SDR images (134) and the target HDR images (120), may be multiplexed as part of the video signal 144, for example, as supplemental enhancement information (SEI) messaging.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (134) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder architecture of FIG. 1A can be used to avoid directly encoding the target HDR images (120) into coded/compressed HDR images in the video signal; instead, the backward reshaping metadata (152) in the video signal can be used to enable downstream decoding devices to backward reshape the SDR images (134) (which are encoded in the video signal) into reconstructed images that are identical to or closely/optimally approximate the reference HDR images (120).

In some embodiments, as illustrated in FIG. 1B, the video signal encoded with the reshaped SDR images in the single layer (144) and the backward reshaping metadata (152) as a part of the overall image metadata are received as input on the decoder side of the codec framework. A decompression block (154) decompresses/decodes compressed video data in the single layer (144) of the video signal into the decoded SDR images (156). Decompression 154 typically corresponds to the inverse of compression 142. The decoded SDR images (156) may be the same as the SDR images (134), subject to quantization errors in the compression block (142) and in the decompression block (154), which may have been optimized for SDR display devices. In a backward-compatible system, the decoded SDR images (156) may be outputted in an output SDR video signal (e.g., over an HDMI interface, over a video link, etc.) to be rendered on an SDR display device.

Optionally, alternatively, or in addition, in the same or another embodiment, a backward reshaping block 158 extracts the backward (or forward) reshaping metadata (152) from the input video signal, constructs the backward reshaping functions based on the reshaping metadata (152), and performs backward reshaping operations on the decoded SDR images (156) based on the optimal backward reshaping functions to generate the backward reshaped images (160) (or reconstructed HDR images). In some embodiments, the backward reshaped images represent production-quality or near-production-quality HDR images that are identical to or closely/optimally approximating the reference HDR images (120). The backward reshaped images (160) may be outputted in an output HDR video signal (e.g., over an HDMI interface, over a video link, etc.) to be rendered on an HDR display device.

In some embodiments, display management operations specific to the HDR display device may be performed on the backward reshaped images (160) as a part of HDR image rendering operations that render the backward reshaped images (160) on the HDR display device.

Cloud-Based Coding

Existing reshaping techniques may be frame-based, that is, new reshaping metadata is transmitted with each new frame, or scene-based, that is, new reshaping metadata is transmitted with each new scene. As used herein, the term "scene" for a video sequence (a sequence of frames/images) may relate to a series of consecutive frames in the video sequence sharing similar luminance, color and dynamic range characteristics. Scene-based methods work well in video-workflow pipelines which have access to the full scene; however, it is not unusual for content providers to use cloud-based multiprocessing, where, after dividing a video stream into segments, each segment is processed independently by a single computing node in the cloud. As used herein, the term "segment" denotes a series of consecutive frames in a video sequence. A segment may be part of a scene or it may include one or more scenes. Thus, processing of a scene may be split across multiple processors.

As discussed in Ref. [1], in certain cloud-based applications, under certain quality constraints, segment-based processing may necessitate generating reshaping metadata on a frame-by-frame basis, resulting in undesirable overhead. This may be an issue in very low bit-rate applications (e.g., lower than 1 Mbit/s). Ref. [6] proposed a solution to this problem using a two stage architecture which includes: a) a dispatcher stage implemented on a single computing node, which allocates scenes into segments and b) an encoding stage, where each node in the cloud encodes a sequence of segments. After a scene is segmented, the proposed scene to segment allocation process includes one or more iterations with an initial random assignment of scenes to nodes, followed by a refined assignment based on optimizing the allocation cost across all the nodes. In such an implementation, the total length of video to be processed in each node may vary across all the nodes.

Embodiments presented herein provide an alternative solution. After a sequence is divided into segments, each segment to be processed by a separate node, in each node, each segment is sub-divided into sub-segments (or scenes) in such a way to minimize the need to update the corresponding reshaping function of each sub-segment, thus minimizing the overhead required to transmit reshaping-related metadata.

Figure 2:
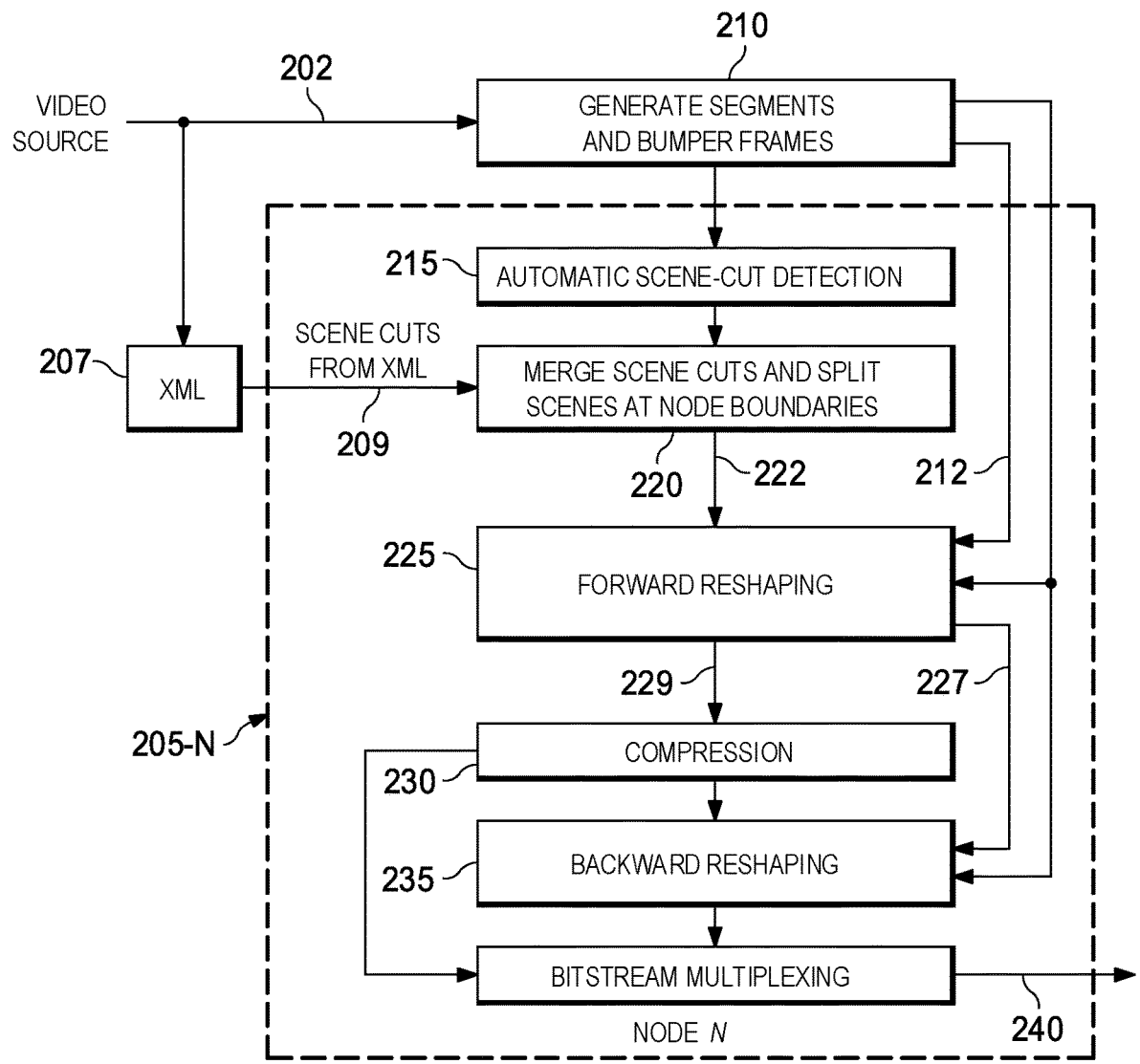
FIG. 2 depicts an example architecture and processing pipeline for cloud-based encoding of HDR video according to an embodiment.

FIG. 2 depicts an example architecture and processing pipeline for cloud-based encoding of HDR video according to an embodiment. Given a video source (202) for content distribution, typically referred to as a mezzanine file, and a set of working nodes, each node (e.g., node 205-N) fetches video pictures (or frames) and corresponding video metadata (207) (e.g., from an XML file) to be processed as follows.

Figure 3A:
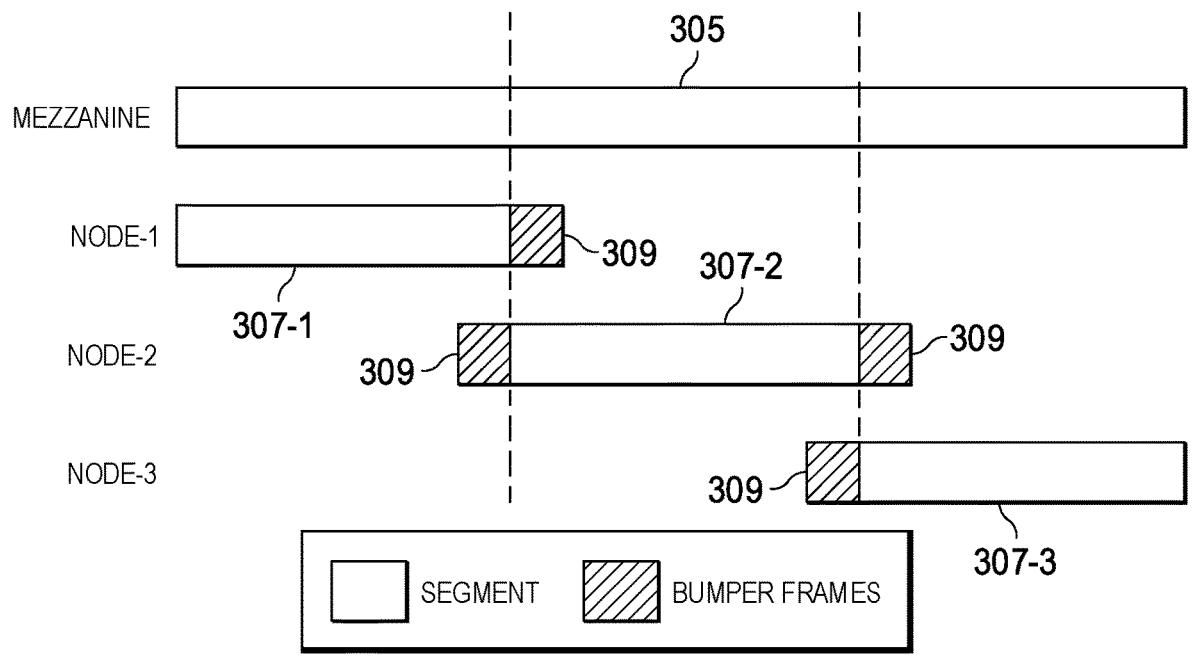
FIG. 3A depicts an example division of a video input into segments and bumper frames to be assigned into three nodes.

In preprocessing step 210, the mezzanine input is split into segments and each segment is assigned to a different computing node (e.g., node 205-N). These segments are mutually exclusive, i.e. they have no frames in common. Each node will also get a certain number of frames that are before the first frame in the segment and some frames after the last frame in the segment. These prior and post overlapped frames, called bumper frames, are only used for maintaining temporal consistency with the previous and the next node respectively. Bumper frames are not encoded by the node. Without loss of generality, in an embodiment, these video segments may be all be of equal, fixed-length, except perhaps for the segment assigned to the last node. As an example, a sample distribution of a mezzanine (305) into three segments (307-1, 307-2, 307-3) along with their bumper frames (e.g., 309), and their assignment of these frames to different nodes is illustrated in FIG. 3A. Without limitation, for segments 30 sec long and bumper sections 2 sec long on each side, example embodiments may include any of the following arrangements:

Segment sections with 1,800 frames and bumper sections with 120 frames, at 60 fps Segment sections with 1,500 frames and bumper sections with 100 frames, at 50 fps Segment sections with 720 frames and bumper sections with 48 frames, at 24 fps After the preprocessing step 210 is over, each node gets access to its frames and a two-pass approach follows.

In Pass-1 (steps 215, 220), a list of scenes (222) in the segment is generated. Scene cuts (209) extracted from the XML file and scene cuts generated using an automatic scene cut detector (215) are combined in step 220 to get a first list of primary scenes. Primary scenes that belong to a parent scene to be coded across multiple nodes may be subdivided to secondary scenes. To maintain temporal consistency in scenes distributed across multiple nodes, bumper frames and a novel recursive scene splitting algorithm is also provided. Splitting produces additional scenes that are added to the first list of scenes to get a second list. This second list of scenes (222) is handed over to Pass-2.

Pass-2 (steps 225, 230, and 235) uses the list of scenes received from Pass-1 to perform forward and backward reshaping for each scene in the segment. Forward reshaping (225) using scene-based forward reshaping functions (227) produces a reshaped SDR segment (229) while the backward reshaping unit (235) generates the metadata parameters to be used by a decoder to reconstruct the HDR input. The reshaped SDR input (229) is compressed (230), and compressed video data and reshaping metadata are combined together to generate a compressed bitstream (240).

For ease of discussion, let L denote the number of frames in a segment, and let B denote number of frames in each bumper section. Let the i-th frame in the mezzanine be denoted as $f_i$. In an embodiment, the first node encodes the frames $f_0 \sim f_{L-1}$ that are in the segment portion. This node has no left bumper, and its right bumper spans the frame range $f_L \sim f_{L+B-1}$. The segment portion of node-N will process frames $f_{(N-1)L} \sim f_{NL-1}$, with $f_{(N-1)L-B} \sim f_{(N-1)L-1}$ being the left bumper and $f_{NL} \sim f_{NL+B-1}$ being the right bumper. The last node will have no right bumper section and it may have less then L frames in the segment portion.

Given a node N, node N−1 is the left/previous neighbor node and node N+1 is the right/next neighbor. Referring to nodes that are left/previous nodes to N includes all the nodes from 0 to N−1. Similarly, referring to nodes that are right/next to N denotes all the nodes from N+1 to the last node. The two passes described earlier will now be discussed in further detail.

Pass-1: Segment to Scene Generation

The key objective of this pass is to generate a list of scenes in the segment allocated to a node. The process starts by detecting scene cuts in all the frames allocated to the node, which includes the node segment and both the bumper sections. Only those scene cuts inside the segment will eventually be used by the Pass-2 for scene-based encoding.

But the scenes in the bumper section are still useful for maintaining temporal consistency with the neighboring nodes.

Colorist-specified scene cuts (209) are read in from the XML file (207). An automatic scene cut detector (215) may also identify possible scene cut locations. These scene cuts from the colorists and the automatic detector are merged to get a first list of scenes, known as primary scenes. Primary scenes on the segment boundaries are split using bumper frames and a novel scene splitting technique. Splitting of a primary scene on a segment boundary creates additional scenes, known as secondary scenes or subscenes. Secondary scenes are added to the first list of scenes to get a second list. This list is then used by the Pass-2 for scene-based encoding. Apart from the list of scenes, Pass-2 may also need auxiliary data (212) for forward reshaping of the secondary scenes. Details for each step are provided next.

Colorists and professional color-graders usually process each scene as a single unit. To meet their goals (e.g., proper color grading, inserting fade-ins and fade-outs, etc.), they need to manually detect scene cuts in the sequence. This information is stored in the XML file and can be used for other purposes as well. Every node will read only the relevant scene cuts for its segment from the XML file. These scene cuts may be in the segment section or in the bumper sections.

Even though XML scene cuts are defined by the colorists, they are not completely accurate. For grading purposes, sometimes colorists introduce scene cuts in the middle of a dissolving scene or at the start of fade in or fade out portion of a scene. These scene cuts, if taken into consideration during the reshaping phase, may cause flashing in the reconstructed HDR video and normally should be avoided. For this reason, in an embodiment, an automatic scene-cut detector (Auto-SCD) 215 is also employed.

An automatic scene-cut detector or Auto-SCD uses the change in luminance levels in different sections of consecutive video pictures to detect a scene change. Any scene cut detector known in the art can be used as the automatic detector. In an embodiment, such an automatic detector is oblivious to dissolving, fade in or fade out parts of the video and it can still detect all the true scene cuts correctly.

A potential problem with an automatic detector is false positives. Sometimes there are brightness changes within a scene due to camera panning, movements, occlusions etc. These brightness changes may also be detected as scene cuts by the Auto-SCD. To discard these false positives, in an embodiment, the scene cuts from the XML file and those from the and Auto-SCD are merged together in step 220. A person skilled in the art will appreciate that if there are no scene cuts defined in the XML file one may simply use the output of the automatic scene detector. Similarly, in other embodiments, one may rely strictly on scene cuts defined in the XML file. Alternatively, one may also use more than two scene-cut detectors, where each one detects different attributes of interest, and then define the primary scenes based on a combination of all of their results (e.g., their intersection or a combination of other set operations, e.g., their union, intersection, and the like).

Figure 3B:
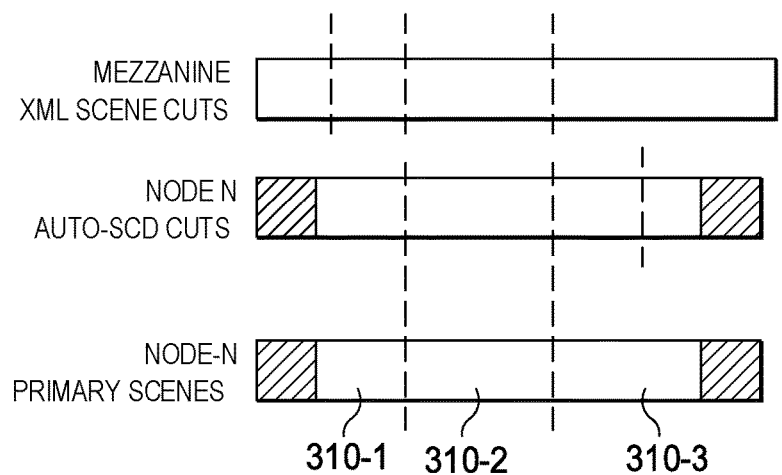
FIG. 3B depicts an example of merging scene cuts to generate a list of primary scenes.

Let $\Psi_{XML}^N$ be the set of frame indices representing scene start frames in node N as reported in the XML file. Similarly, let $\Psi_{Auto\text{-}SCD}^N$ denote the set of frame indices representing scene start frames in node N as reported by Auto-SCD. In an embodiment, merging the scene cuts from these two sets is equivalent to taking the intersection of these two sets.

$$\Psi_1^N = \Psi_{XML}^N \cap \Psi_{Auto\text{-}SCD}^N, \tag{1}$$

where, $\Psi_1^N$ indicates the first list of scene cuts (or scenes) in the node N. These scenes are also known as primary scenes. FIG. 3B demonstrates an example scenario. In this example, the XML file reports three scene cuts. The Auto-SCD reports also three scene cuts; two are the same as the XML scene cuts, but the third one is in a different location. Since between the six reported scene cuts only two are common, the node segment is divided into only three primary scenes (310-1, 310-2, and 310-3) according to the two common scene cuts. In some embodiments, XML and Auto-SCD scene cuts may be recognized as the same even if they are reported on different frames, provided the scene-cut indices between the two lists differ within a given small tolerance (±n frames, e.g., n in [0,6]).

As depicted in FIG. 3B, primary scene 2 (310-2) is entirely in node N. Therefore, it can be processed entirely by node N in Pass-2. On the contrary, primary scenes 1 (310-1) and 3 (310-3) are on the segment boundary. Their parent scenes are distributed across multiple nodes and processed by those nodes independently. There has to be some special handling for primary scenes 1 and 3 to ensure consistent look in boundary frames that are encoded by different nodes. A number of alternative scenarios are examined next.

Figure 3C:
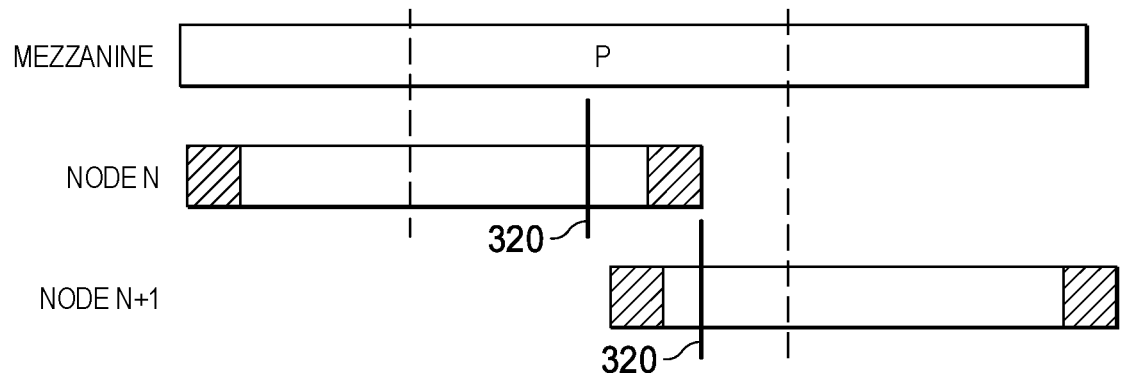
FIG. 3C depicts an example of a primary scene split into two computing nodes.

As depicted in FIG. 3C, consider a simple scenario where P is a parent scene distributed across two nodes N and N+1. Node N and N+1 have access to only a part of the parent scene. Let us assume that these nodes process and encode their respective portions of the parent scene (without bumpers). Reshaping parameters are computed on different sets of frames, so the reshaped SDR and reconstructed HDR for last frame in segment of node N, i.e. $f_{(N+1)L-1}$ and first frame in segment of node N+1 i.e. $f_{(N+1)L}$ may look visually different. Such a visual difference is usually manifested in the form of flickering, flashing and sudden brightness change. This problem is referred to as temporal inconsistency across nodes. Part of the reason for inconsistencies in the above scenario is the lack of common frames while computing reshaping parameters. As shown in FIG. 3C, if the bumper frames are included in generating these statistics, it will provide smoother transition across nodes. But the bumper sections may be relatively short compared to the parent scene, so they may not be long-enough to ensure temporal consistency. In an embodiment, to solve these problems, portions of the parent scene in nodes N and N+1 are split into secondary scenes or subscenes. Even if reshaping statistics in a scene change significantly from one node to the next, those statistics do not change much from one frame to the next. Secondary scenes will only use statistics in a small neighborhood to evaluate reshaping parameters. Therefore, these reshaping parameters do not change much from one subscene to the next. In this way, splitting achieves temporal consistency. Note that the neighboring subscenes can be on the previous/next node as well.

It should be noted that splitting creates additional scenes and thus increases the metadata bitrate. The challenge is to achieve temporal consistency using a minimum number of splits to keep the metadata bitrate low. Bumper frames play a significant role in achieving a good visual quality while reducing the number of splits.

1. Bumper frames help the splitting algorithm to mimic the splits that the previous/next node is going through. Valuable insights gained by mimicking splits on other nodes help minimize the number of splits.
2. A smoother transition can be achieved at segment boundaries by using bumper frames for computing reshaping parameters.

The scene splitting algorithm is described in the following subsections. Discussion starts with splitting a parent scene without considering a multi-node allocation, then the method is extended to scene splitting for a parent scene distributed across two or more neighboring nodes.

Figure 4:
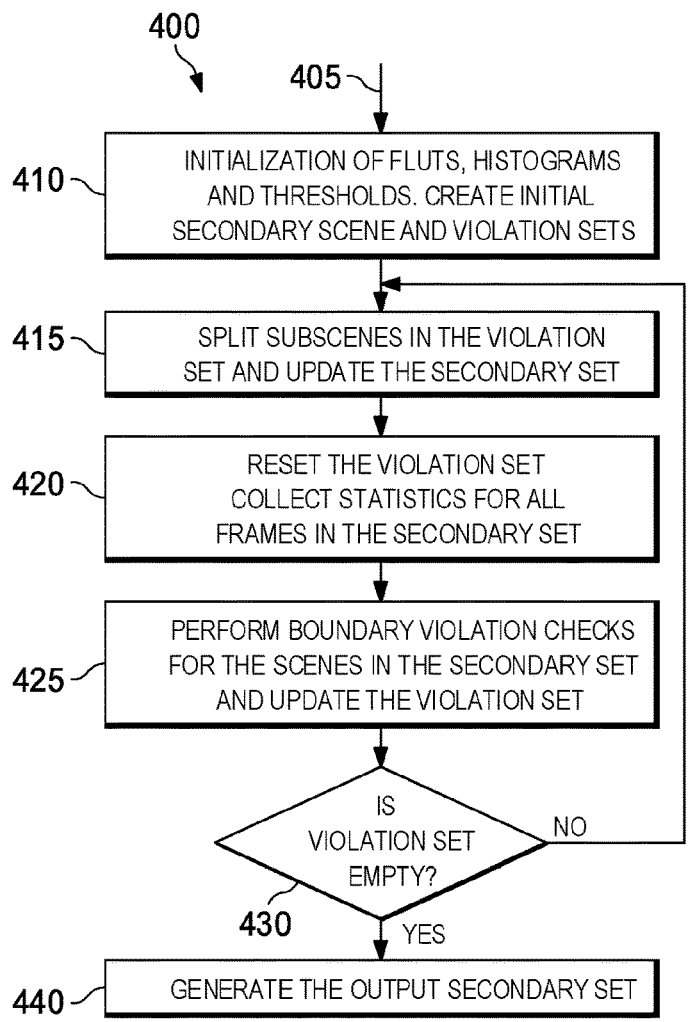
FIG. 4 depicts an example of an iterative segment to scene segmentation process according to an embodiment.

Consider a case with a parent scene P with M frames (M>1) ranging from the Q-th index frame to the Q+M−1 frame in the mezzanine. FIG. 4 depicts an example process (400) for splitting a primary scene to subscenes according to an embodiment. The goal of the process is to divide a primary scene into subscenes with "temporal stability" or "temporal consistency." All frames in each subscene will be reshaped with the same scene-based reshaping function. Thus, temporal stability, allows for reduced number of reshaping metadata while maintaining the video quality at a given bitrate.

Process 400 starts with an initialization step 410, where, given input HDR and SDR frames (405) for primary scene P, HDR and SDR histograms $h^v$ and $h^s$, and individual forward reshaping functions $\tilde{T}_j^F$ (FLUTs) are computed for each frame in scene P. As an example, and without limitation, given frame histograms, one can apply cumulative density function (CDF) matching (Ref. [4-5]) to generate the forward mapping function (FLUT) from HDR to SDR, e.g., $$T^F = \text{CDF\_MATCHING}(h^v(b), h^s(b)). \tag{2}$$

thus, for the j-th frame, this step generates:

$$\tilde{T}_j^F, h_j^v \forall j \in [Q, Q+M-1], \tag{3}$$

where $h_j^v$ denotes a histogram of HDR frame j.

The segmentation methods described herein are agnostic on how frame-based reshaping functions are generated. Thus, in an embodiment, such reshaping functions may be generated directly from the available HDR video using any of the known reshaping techniques and without any dependency on the availability of a corresponding SDR video.

A scene FLUT $\tilde{T}_P^F$ is constructed for P by averaging all the frame FLUTs in the scene. In the following equation, b indicates the index in the FLUT. In an embodiment, FLUT values may be normalized, i.e. $\tilde{T}_j^F(b) \in [0.0, 1.0]$.

$$\tilde{T}_P^F(b) = \frac{1}{M} \sum_{j=Q}^{Q+M-1} \tilde{T}_j^F(b). \tag{4}$$

The scene FLUT and the generated histograms are used to predict a "DC" value $\chi_j$ for every frame in scene P. If the height and width of a frame are H and W respectively, then its DC value is computed as $$\chi_j = \frac{1}{H \times W} \sum_b \tilde{T}_P^F(b) \times h_j^v(b) \ \forall \ j \in [Q, Q+M-1]. \tag{5}$$

In an embodiment, the DC difference of every frame with its previous frame, denoted as $\mathfrak{I}_j^{DC}$, is used as one set of thresholds to make the splitting decisions. These $\mathfrak{I}_j^{DC}$ values are calculated once during the initialization phase and are used several times during the splitting process:

$$\mathfrak{I}_j^{DC} = \Psi_j - \chi_{j-1} \forall j \in [Q+1, Q+M-1]. \tag{6}$$

The maximum absolute element-wise difference between the FLUT of every frame with its previous frame's FLUT is stored also at the initialization stage to be used as an additional set of thresholds for detecting smoothness violations. Here α and β are configurable parameters, with typical values being 2.0 and 0.60 respectively.

$$\mathfrak{I}_j^{FLUT}=\max(\alpha\times\max(\{|\hat{T}_j^F(b)-\hat{T}_{j-1}^F(b)|\|\forall b\}),\beta)\forall j\in [Q+1,Q+M-1] \quad (7)$$

Secondary scene cuts $C_g$ are collected in a sorted subscene set $\Omega_P$, where g is an index in the set. The frame index Q+M acts as the end of the list marker and is not used as a scene cut. In an embodiment, secondary scene cuts at initialization are as follows:

$$\Omega_P=\{Q,Q+M\}=\{C_0,C_1\}. \quad (8)$$

In an embodiment, a violation subscene set $\Upsilon$ is used to store the subscenes that violate the smoothness criteria. To start splitting parent scene P, at initialization, $\Upsilon=\{P\}$. Only the scenes or subscenes in the violation set will be split later on. In summary, in step 410, the initialization step generates: $\mathfrak{I}_j^{DC}$ and $\mathfrak{I}_j^{FLUT}$ values, a violation set $\Upsilon$, and a sorted set of scene cuts $\Omega_P$.

In step 415, given a violation set $\Upsilon$ and a sorted set of secondary scene cuts $\Omega_P$ as the input, a new round of subscene splitting begins. One iterates through all the subscenes in violation set $\Upsilon$ and decides on how to split them.

Let $P_g$ be a subscene in the violation set that spans the frame range $[C_g, C_{g+1}-1]$. For splitting, one compares subscene FLUT $\hat{T}_{P_g}^F$, with every frame FLUT $\hat{T}_j^F$ in the subscene and selects as the split frame the one at index location $C_s$ with the most similar FLUT, $$C_s = \min_j \sum_b \left| \hat{T}_{P_g}^F(b) - \hat{T}_j^F(b) \right|, \quad (9)$$

where the mathematical operator |•| denotes the absolute value.

After the split, the subscene $P_g$ is divided into two subscenes or secondary scenes and the new splitting index is inserted into the secondary set at the correct location.

$$\Omega_P=\Omega_P\cup\{C_s\}. \quad (10)$$

All the new splits from all the subscenes in the violation set are inserted into the set $\Omega_P$ in a sorted manner. The violation set $\Upsilon$ is set to an empty set after iterating through every subscene in it. The updated set $\Omega_P$ is passed on to the next step in the splitting process.

In step 420, new subscene FLUTs are computed for every secondary scene in the updated set $\Omega_P$. Suppose at this time, the set DT contains G+1 secondary scene cuts from $C_0$ to $C_G$ as shown in the next equation.

$$\Omega_P=\{C_0,C_1\ldots C_g\ldots C_{G-1},C_G\}. \quad (11)$$

There are G subscenes in this iteration round, and the frame indices in the set $\Omega_P$ are in ascending order, i.e.

$$Q=C_0<C_1\ldots<C_g<\ldots<C_{G-1}<C_G=Q+M. \quad (12)$$

Consider subscene $P_g$ that spans the frame range $[C_g, C_{g+1}-1]$. To build a subscene FLUT, i.e. $\hat{T}_{P_g}^F$, for $P_g$ for $g\in[0,G-1]$, a subscene overlap parameter $\theta$ is introduced to allow a small overlap between neighboring subscenes.

$$\Theta'=\max(Q,C_g-\theta),$$

$$\Theta''=\min(Q+M-1,C_{g+1}-1+\theta). \quad (13)$$

The overlap frames are used to estimate the forward LUT for the subscene $P_g$ by averaging the FLUTs in the subscene and the overlap portion.

$$\hat{T}_{P_g}^F(b) = \frac{1}{\Theta''-\Theta'+1}\sum_{j=\Theta'}^{\Theta''} \hat{T}_j^F(b), \forall g \in [0, G-1], \quad (14)$$

In the current round of the splitting process, let the DC value be defined by $\lambda$. These DC values will be used later on in step 425 to find threshold violations at the subscene boundaries. Let $$\lambda_j = \frac{1}{H\times W}\sum_b \hat{T}_{P_g}^F(b)\times h_j^y(b) \ \forall j \in [C_g, C_{g+1}-1], \quad (15)$$

$$\forall g \in [0, G-1].$$

These new DC values for all the frames in the primary scene P are collected after iterating through all the subscenes in $\Omega_P$ and computing statistics in them.

In step 425, temporal stability violations at boundaries between subscenes are detected. For example, for secondary scenes $P_{g-1}$ in $\{C_{g-1}, C_g-1\}$ and $P_g$ in $\{C_g, C_{g+1}-1\}$, a boundary check needs to be computed at $C_g$. If any one of the checks fail, then both subscenes $P_{g-1}$ and $P_g$ are moved to the violation set Y. For subscenes $P_g$ and $P_{g+1}$, a boundary check needs to be computed at $C_{g+1}$. The same checks are applied at each subscene boundary $C_g$, except at the first frame of the segment, $C_0$ (Q), and the last frame of the segment, Q+M−1=$C_G$−1.

Using equation (15), updated DC values ($\lambda_j$) are available for all the frames in the primary scene P after iterating through all the subscenes in $\Omega_P$. These values will be used in steps 425 and 430 to perform boundary-violation checks. The DC difference $\Delta_{C_g}$, is the difference between DC values of frame with index $C_g$ and its previous frame with index $C_g-1$.

$$\Delta_{C_g}=\lambda_{C_g}-\lambda_{C_g-1}. \quad (16)$$

Violation Check #1:

Is it true that $|\Delta_{C_g}|>|\mathfrak{I}_{C_g}^{DC}|+\omega$? $\quad (17)$

If absolute DC difference $|\Delta_{C_g}|$ is greater than DC threshold $|\mathfrak{I}_{C_g}^{DC}|$ plus a non-negative bias $\omega$, then there is a brightness change at the transition point $C_g$ between subscenes $P_{g-1}$ and $P_g$. This is a threshold violation and these subscenes are appended to the violation set $\Upsilon$. Here, bias $\omega$ denotes a configurable parameter with the default value being 0.001 (or ¼ codeword in 8-bit). This is the most important violation check in the splitting process as it has more impact on the splitting results than the next two checks.

Violation Check #2:

Is it true that $\text{sign}(\Delta_{C_g})\neq\text{sign}(\mathfrak{I}_{C_g}^{DC})$? $\quad (18)$ The sign(x) (or signum) operator for a real number x is defined as follows:

$$\text{sign}(x) = \begin{cases} -1 & \text{if } x<0 \\ 0 & \text{if } x=0 \\ 1 & \text{if } x>0 \end{cases}.$$

A positive DC difference $\Delta_{C_g}$ indicates that the DC value has increased from the previous frame to the current frame. Similarly, a negative DC difference indicates that the DC value has decreased. The general trend of increasing/decreasing DC value from previous frame to the next frame should be maintained after splitting in the subscenes. So, if threshold $\mathfrak{I}_{C_g}^{DC}$ and DC difference $\Delta_C$ have opposite signs at point $C_g$, then both the subscenes $P_{g-1}^g$ and $P_g$ should be split further by adding them to the violation set $\Upsilon$. This criterion is helpful in maintaining temporal stability in fade in/out, dissolving scenes or any scene with gradual brightness changes.

Violation Check #3:

Is it true that $\max(\{|\tilde{T}_{P_g}^F(b) - \tilde{T}_{P_{g-1}}^F(b)| \forall b\})$
$> \mathfrak{I}_{C_g}^{FLUT}$? (19)

If maximum of absolute element-wise difference between FLUTs $\tilde{T}_{P_g}^F$ and $\tilde{T}_{P_{g-1}}^F$ is greater than threshold $\mathfrak{I}_{C_g}^{FLUT}$ at $C_g$, then these subscenes $P_{g-1}$ and $P_g$ violate smoothness constraint and should be included in $\Upsilon$.

All the violation checks are at subscene boundaries. If there is a violation, then both subscenes are entered into the violation set. This ends the current round of splitting. At step 430, if the updated violation set is not empty, control goes back to step 415 with the updated $\Omega_P$ and $\Upsilon$ sets for the next round of splitting. Otherwise, if there are no boundary violations and the violation set is empty, the process terminates and step 440 outputs the final secondary set of subscenes. In an embodiment, in step 425, if a secondary scene in $\Upsilon$ is only one frame long, it can be removed from the $\Upsilon$ set, since it is impossible to be further split. Alternatively, such single-frame scenes can be ignored in step 415.

In practice, a parent scene is sub-divided only if it is processed across two or more nodes. For example, a node may look for scene cuts at the left and right bumper sections. If no such scene cuts are detected, then it can deduce that the beginning or end of its segment is processed by neighboring nodes as well, thus, one or more primary scenes need to be subdivided.

Consider a scenario shown in FIG. 3C, where a parent scene P is processed by two nodes. Each portion of the parent scene in a node is the primary scene for that node. One approach is to split them independently using the splitting approach described earlier. Then, because of missing statistics, scene cuts in the overlapping regions of the nodes N and N+1 may not match each other. The proposed splitting algorithm works much better in resolving temporal inconsistencies if it has a good estimation of secondary scene boundaries in the neighboring subscenes on the neighbor node.

In an embodiment, for the example in FIG. 3C, two new synchronization subscene cuts (320) in those two primary scenes are introduced, one in each node. These synchronization cuts split the primary scene into two portions:

1. A first portion (e.g., between the first cut and the first sync cut in node N) is visible to the current node but not visible to the other node. As shown in FIG. 3C, in an embodiment, the first sync cut, on node N, may be at position $C_{L-1}$–B, where B denotes the number of bumper frames and $C_{L-1}$ denotes the last frame of the segment.
2. A second portion (e.g., the end bumper frames for node N and the initial bumper frames for node N+1) is "visible" to both nodes. As shown in FIG. 3C, in an embodiment, the second sync cut, on node N+1, may be at position $C_0$+B, where $C_0$ denotes the first frame of the segment.

In an embodiment, these initial sync splits may be performed as part of step 410, and one can apply the splitting algorithm 400 on these primary scenes. The only minor change will be in the initialization step 410, where the set $\Omega_P$ for each node will include one additional synchronization scene cut (320). Then, since there is no need to do further splits one can directly jump to step 420 after initialization. Next, the algorithm proceeds as usual.

Alternatively, given the original $\Omega_P$ set, upon detecting that a primary scene is not fully in the current node, this sync subdivision may be performed in step 415 using the rules described earlier (e.g., for node N, if the primary scene does not terminate at node N, adding a scene cut at position $C_{L-1}$–B) in lieu of using equation (9).

With these initial synchronization splits, the subscene cuts computed by nodes N and N+1 in isolation are expected to be reasonably aligned with each other. For node N, let $\Psi_1^N$ denote a first list of scenes obtained after merging the XML scene cuts with Auto-SCD scene cuts as seen in FIG. 3B. These scenes are termed as primary scenes. The scenes that lay on the segment boundaries are split into secondary scenes or subscenes. Secondary scenes or subscenes generate additional scenes cuts that are appended to the first list. Apart from these secondary scene cuts, the first frame of the segment $f_{NL}$ is also a scene cut. The node can only start encoding from start of the segment, so that frame is treated as a scene cut. Similarly, the last frame of the segment $f_{(N+1)L-1}$ is the end of the last scene in the segment. For example, consider node N with the following initial allocation: Primary scenes 1, 2, and 3. Primary scene 1 is subdivided into secondary scenes A, B, and C, primary scene 2 remains unchanged, and primary scene 3 may be divided into secondary scenes D, E, and F. Suppose $\Psi_l^N$ and $\Psi_r^N$ indicate the set of scene cuts near the left and right segment boundary respectively for node N. Then a second list of scenes $\Psi_2^N$ can be mathematically represented as:

$$\Psi_2^N = \Psi_1^N \cup \Psi_l^N \cup \Psi_r^N \cup f_{NL} \quad (20)$$

There is a possibility that for a scene longer than a segment length, there may not be separate left or right sets, but a single set of secondary scene cuts. Let $S_k$ denote the starting frame index for the $k^{th}$ scene in the list $\Psi_2^N$. Suppose there are K scenes in the list, then the elements in the list can be expressed by the following equation. Here $S_K$ is a dummy scene cut that is just after the last frame of the segment. It is only used as an end-of-list marker.

$$\Psi_2^N = \{S_0, S_1, S_2 \ldots S_{k-1}, S_k, S_{k+1} \ldots S_K\}. \quad (21)$$

By default, $S_0 = f_{NL}$ as the first frame of the segment is also a beginning of a new scene for node N. The second list of scenes $\Psi_2^N$ (222) is handed over to Pass-2 along with subscene-related auxiliary data.

The second list of scenes $\Psi_2^N$ has details about the primary and secondary scenes in the segment. Primary scenes do not need any additional data from Pass-1, but secondary scenes require the following auxiliary data from Pass-1.

1. The number of overlapping frames on the left and right side for every secondary scene.
2. Trim pass correction data As used herein, "trim pass" data or metadata refers to "trim" data generated by colorists during color grading to meet director's intent. Sometimes the trims results in clipping of highlights and/or crushing of low intensity values. Reconstructing HDR from a trim-affected SDR introduces undesirable artifacts in reconstructed HDR video. To reduce these artifacts, as discussed in Ref. [5], trim-correction algorithms may need some supplemental data. While trim-pass correction processing may be part of node-based processing, the details are beyond the scope of the invention and are not discussed herein.

There are two major types of scenes in the proposed architecture, namely, primary scenes and secondary scenes. Pass-2 processes all scenes to produce the same set of composer metadata parameters for every frame in that scene. In the forward phase of Pass-2, reshaping parameters are computed from all the frames in the statistics collection window of that scene.

For a primary scene, the statistics collection window includes all the frames in the primary scene. Frames outside the primary scenes are not referenced.

On the contrary, for a secondary scene, the statistics collection window includes all the frames in that secondary scene plus some overlapping frames from the previous or next subscene. These extra frames are termed as overlapping frames.

As a rule, a primary scene will have no overlap with any neighboring scene, and secondary scenes are only allowed to have overlap with neighboring secondary scenes. In other words, the overlapping frames for a subscene can never come from a neighboring primary scene. The overlap parameter θ (see equation (13)) is set by the user and the default value is 1. Backward phase in Pass-2 uses no such overlap for primary or secondary scenes.

Figure 3D:
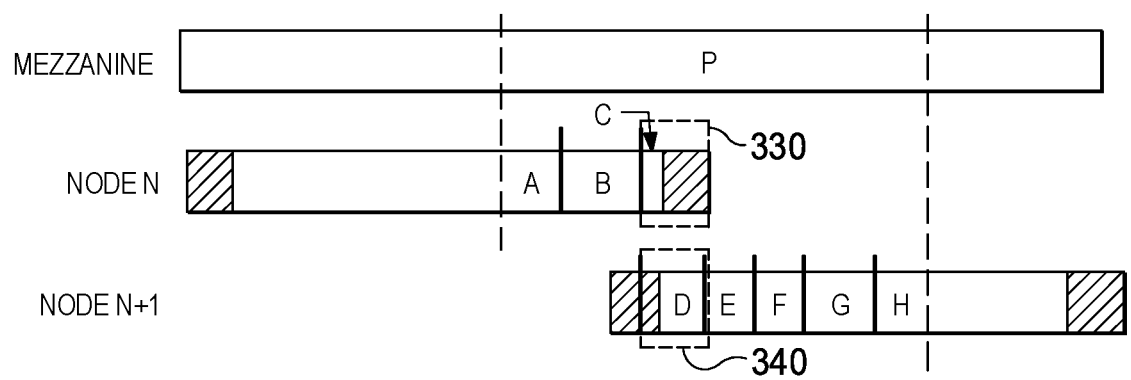
FIG. 3D depicts an example of statistics windows used to derive scene-based forward reshaping functions according to an embodiment.

To elaborate on the number of left and right overlapping frames, refer to FIG. 3D, showing an example embodiment with subscenes A to H. The forward reshaping statistics window for subscene A will have no extra frames on the left and θ extra frames on the right (part of subscene B). Subscene H will have extra frames only on the left (part of subscene G). Subscenes B, E, F, and G will have extra frames on both left and right. For subscenes C and D, the number of left and right overlapping frames are computed a little differently. Subscene C uses θ extra frames on the left from subscene B. On the right side, it takes all the frames till the next scene cut. In this example, there is no scene cut to the right, so it takes all the bumper frames. Scene cuts at the start of a segment are ignored for computing the number of overlapping frames. The dotted box (330) over subscene C depicts the frames in the subscene C plus its overlapping frames to the right. For subscene D, there are θ extra frames on the right. On the left side, it takes all the frames till the previous scene split. The scene split shown by a solid vertical line marks the start of the segment and is ignored for computing overlapping frames. The dotted box (340) over the subscene D shows the frames in subscene and its overlapping frames to the left.

The reason for ignoring the start of the segment scene cut is to make the forward reshaping statistics windows (e.g., 330 and 340) for C and D the same. Same forward reshaping parameters are computed for C and D even if they are on different nodes. This helps achieve consistent look on neighboring subscenes across nodes. Synchronization scene cuts play an important role in aligning all the scene cuts on node N and N+1 so that C and D will end up having the same statistics window.

Pass-2: Scene-Based Encoding

As depicted in FIG. 2, every node is allocated a segment which is encoded into the bitstream. Pass-1, described earlier, generates a list of primary and secondary scenes that minimize the bitrate of reshaping-related metadata while maintaining temporal consistency across neighboring nodes. Pass-2 uses this list to encode the scenes in the segment and generate a reshaped SDR coded bitstream. As depicted in FIG. 3A, bumper frames (309) are not encoded, but they are used to collect statistics in a forward reshaping pass to maintain the temporal stability of the secondary scenes.

Figure 5:
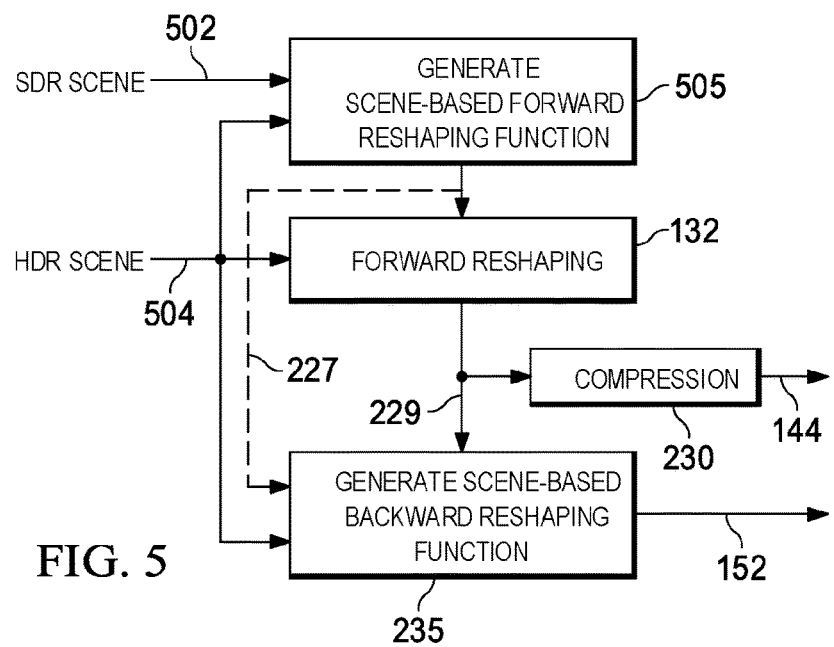
FIG. 5 depicts an example encoder for scene-based encoding using reshaping according to an embodiment of this invention.

As depicted in FIG. 2, Pass-2 includes steps 225, 230, and 235. An alternative view of the same processing pipeline, at the scene or subscene level, is also depicted in FIG. 5. For forward reshaping, primary and secondary scenes are handled in a similar manner except for one main difference: primary scenes have no overlap in forward reshaping, but secondary scenes have some overlap with neighboring subscenes. For backward reshaping, the process is exactly the same for both primary and secondary scenes. There is no overlap in the backward reshaping phase. A composite bitstream (240) consisting of reshaping metadata and a compressed base layer is generated as the output. Details of each block are described next.

Given a segment to scenes list (222), FIG. 5 depicts an example architecture for scene-based encoding on each node in the cloud. Without limitation, block 225 in FIG. 2 may be split as shown, using blocks 505 and block 132. Let the starting frame index for the k-th scene be denoted a $S_k$. Thus, given a scene k, a node needs to process frames $S_k$, $S_{k+1}$, $S_{k+2}$, . . . , and $S_{k+1}-1$. Reference HDR frames (504) and corresponding SDR frames (502) for a scene may be stored in corresponding SDR and HDR scene buffers (not shown). As discussed, bumper frames are used only for generating statistical data for the secondary scenes and are ignored when processing primary scenes.

From FIG. 5, in step 505, the input SDR and HDR frames are used to generate a scene-based forward reshaping function. The parameters of such a function will be used for the whole scene (vs. being updated on a frame-by-frame basis), thus reducing the overhead for metadata 152. Next, in step 132, forward reshaping is applied to the HDR scene (504) to generate a reshaped base layer 229, to be coded by compression unit (230) to generate the coded bitstream 144. Finally, in step 235, the reshaped SDR data 229 and the original HDR data (504) are used to generate parameters 152 for a backward reshaping function to be transmitted to a downstream decoder together. These steps will be described in more detail next. Without limitation, steps are described in the context of what is referred to as a three-dimensional mapping table (3DMT) representation where, to simplify operations, each frame is represented as a three dimensional mapping table, where each color component (e.g., Y, Cb, or Cr) is subdivided into "bins," and instead of using explicit pixel values to represent an image one uses the pixel averages within each bin. Details of the 3DMT formulation can be found in Ref. [3].

Scene-based generation of a forward reshaping function (505) consists of two levels of operation. First, statistics are collected for each frame. For example, for luma, one computes the histograms for both SDR (h; (b)) and HDR (h; (b)) frames and stores them in the frame buffer for the j-th frame, where b is the bin index. After generating the 3DMT representation for each frame, one generates an "a/B" matrix representation denoted as:

$$B_j^F = (S_j^F)^T S_j^F,$$

$$a_j^{F,ch} = (S_j^F)^T v_j^{F,ch}, \qquad (22)$$

where ch refers to a chroma channel (e.g., Cb or Cr), $(S_j^F)^T$ denotes a transpose matrix based on the reference HDR scene data and a parametric model of the forward reshaping function, and $v_j^{F,ch}$ denotes a vector based on the SDR scene data and the parametric model of the forward reshaping function.

Given the statistics of each frame within the current scene, one can apply a scene-level algorithm to compute the optimal forward reshaping coefficients. For example, for luma, one can generate scene-based histograms for SDR ($h^s(b)$) and HDR data ($h^v(b)$) by summing or averaging the frame-based histograms. For example, in an embodiment, $$h^s(b) = \sum_{j=S_k}^{S_{k+1}-1} h_j^s(b),$$

$$h^v(b) = \sum_{j=S_k}^{S_{k+1}-1} h_j^v(b). \quad (23)$$

Having both scene-level histograms, one can apply cumulative density function (CDF) matching (Ref. [4-5]) to generate the forward mapping function (FLUT) from HDR to SDR, e.g., $$\tilde{T}^F = \text{CDF\_MATCHING}(h^v(b), h_s(b)). \quad (24)$$

For chroma (e.g., ch=Cb or ch=Cr), one may again average over the a/B frame-based representations in equations (22) to generate a scene-based a/B matrix representation given by $$B^F = \frac{1}{S_{k+1} - S_k} \sum_{j=S_k}^{S_{k+1}-1} B_j^F, \quad (25)$$

$$a^{F,ch} = \frac{1}{S_{k+1} - S_k} \sum_{j=S_k}^{S_{k+1}-1} a_j^{F,ch},$$

and generate parameters for a multiple-color, multiple-regression (MMR) model of a reshaping function as (Ref. [2-3])

$$m^{F,ch} = (B^F)^{-1} a^{F,ch}. \quad (26)$$

Then, the reshaped SDR signal (229) can be generated as:

$$\hat{v}_j^{F,ch} = B^F m^{F,ch}. \quad (27)$$

Generating the scene-based backward reshaping function (152) includes also both frame-level and scene-level operations. Since the luma mapping function is a single-channel predictor, one can simply revert the forward reshaping function to obtain the backward reshaping function. For chroma, one forms a 3DMT representation using the reshaped SDR data (229) and the original HDR data (504) and computes a new frame-based a/B representation as:

$$B_j^B = (S_j^B)^T S_j^B,$$

$$a_j^{B,ch} = (S_j^B)^T v_j^{B,ch}. \quad (28)$$

At the scene-level, for luma, one may apply the histogram-weighted BLUT construction in Ref. [3] to generate the backward luma reshaping function. For chroma, one can again average the frame-based a/B representation to compute a scene-based a/B representation $$B^B = \frac{1}{S_{k+1} - S_k} \sum_{j=S_k}^{S_{k+1}-1} B_j^B, \quad (29)$$

$$a^{B,ch} = \frac{1}{S_{k+1} - S_k} \sum_{j=S_k}^{S_{k+1}-1} a_j^{B,ch},$$

with an MMR model solution for the backward reshaping mapping function given by $$m^{B,ch} = (B^B)^{-1} a^{B,ch}. \quad (30)$$

Then, in a decoder, the reconstructed HDR signal (160) can be generated as:

$$\hat{v}_j^{B,ch} = B^B m^{B,ch}. \quad (31)$$

REFERENCES

Each of these references is incorporated by reference in its entirety.

1. H. Kadu et al., "Coding of high-dynamic range video using segment-based reshaping," U.S. Pat. No. 10,575,028.
2. G-M. Su et al., "Multiple color channel multiple regression predictor," U.S. Pat. No. 8,811,490.
3. Q. Song et al., PCT Patent Application Ser. No. PCT/US2019/031620, "High-fidelity full reference and high-efficiency reduced reference encoding in end-to-end single-layer backward compatible encoding pipeline," filed on May 9, 2019, published as WO 2019/217751.
4. B. Wen et al., "Inverse luma/chroma mappings with histogram transfer and approximation," U.S. Pat. No. 10,264,287.
5. H. Kadu and G-M. Su, "Reshaping curve optimization in HDR coding," U.S. Pat. No. 10,397,576.
6. G-M. Su et al., "Workload allocation and processing in cloud-based coding of HDR video," U.S. Provisional Patent Application, Ser. No. 63/049,673, filed on Jul. 9, 2020.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to segment to scene segmentation and node-based processing in cloud-based video coding of HDR video, such as those described herein. The computer and/or IC may compute, any of a variety of parameters or values that relate to scene segmentation and node-based processing in cloud-based video coding of HDR video as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for scene segmentation and node-based processing in cloud-based video coding of HDR video as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. he computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to scene segmentation and node-based processing in cloud-based video coding of HDR video are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method for segmenting a video segment into scenes using a processor, the method comprising:
receiving in a current computing node a first video sequence comprising video frames in a high dynamic range;
generating for each video frame in the first video sequence a frame-based forward reshaping function, wherein a forward reshaping function maps frame pixels from the high dynamic range to a second dynamic range lower than the high dynamic range;
generating a set of primary scenes for the first video sequence;
generating a second set of scenes for the first video sequence based on the set of primary scenes, secondary scenes derived from one or more primary scenes, and the frame-based forward reshaping functions;
generating scene-based forward reshaping functions based on the second set of scenes;
applying the scene-based forward reshaping functions to the first video sequence to generate an output video sequence in the second dynamic range; and
compressing the output video sequence to generate a coded bitstream in the second dynamic range, wherein, given a primary scene, generating a list of secondary scenes for the primary scene comprises:
initializing a set of secondary scenes and a set of violation scenes based on the set of primary scenes;
generating one or more sets of smoothness thresholds based on the frame-based forward reshaping functions; and
repeating until there are no boundary violations:
dividing each scene in the set of violation scenes into two new subscenes;
generating an updated set of violation scenes with an empty set;
generating an updated set of secondary scenes by adding the two new subscenes to the set of secondary scenes;
performing one or more boundary violation checks in the set of secondary scenes using the one or more sets of smoothness thresholds; and
if there is at least one boundary violation between two subscenes in the set of secondary scenes, then adding the two subscenes to the set of violation scenes and continuing subdividing the primary scene with the updated set of violation scenes and the updated set of secondary scenes;
else, signaling there are no boundary violations and outputting the list of secondary scenes.

EEE 2. The method of EEE 1, wherein generating the set of primary scenes comprises:
accessing a first set of scene cuts from an XML file related to the first video sequence;
generating a second set of scene cuts for the first video sequence using an automatic scene-change detector;
generating a final set of scene cuts based on an intersection of the first set of scene cuts and the second set of scene cuts; and
generating the set of primary scenes using the final set of scene cuts.

EEE 3. The method of EEE 1 or EEE 2, wherein a primary scene is divided into secondary scenes only if it belongs to a parent scene with picture frames to be coded across the current computing node and a neighbor computing node to the current computing node.

EEE 4. The method of any of EEEs 1-3, wherein given a scene $P_g$ in the set of violation scenes, the scene is split in frame location $C_s$, wherein:
if the scene $P_g$ comprises a primary scene which is part of a parent scene with frames to be processed in a node prior to the current node, then $$C_s = C_0 + B,$$

wherein, $C_0$ denotes the first frame in the first video sequence and B denotes a number of bumper frames shared by two neighboring nodes;
else, if the scene $P_g$ comprises a primary scene which is part of a parent scene with frames to be processed in a node subsequent to the current node, then $$C_s = C_{L-1} - B,$$

wherein $C_{L-1}$ denotes the last frame in the first video sequence;
else, if the scene $P_g$ comprises a secondary scene $$C_s = \min_j \sum_b \left| \tilde{T}_{P_g}^F(b) - \tilde{T}_j^F(b) \right|,$$

wherein $\tilde{T}_j^F(b)$ denotes a frame-based forward reshaping function for frame-j in the first video sequence as a function of input codewords b, and $\tilde{T}_{P_g}^F(b)$ denotes an average of frame-based forward reshaping functions for frames related to the scene $P_g$.

EEE 5. The method of any of EEEs 1-4, wherein generating the one or more smoothing thresholds comprises computing a first set of smoothing thresholds $\mathfrak{S}_j^{DC}$ for each frame j in the first video sequence, $$\mathfrak{S}_j^{DC} = \Psi_j - \chi_{j-1},$$

wherein $$\chi_j = \frac{1}{H \times W} \sum_b \tilde{T}_P^F(b) \times h_j^v(b),$$

wherein $\tilde{T}_j^F(b)$ denotes a frame-based forward reshaping function for frame-j in the first video sequence as a function of input codewords b, $h_j^v(b)$ denotes a histogram of the j-th frame in the first video sequence, and H and W denote width and height values for the frames in the first video sequence.

EEE 6. The method of EEE 5, further comprising computing a second set of smoothing thresholds $\mathfrak{S}_j^{FLUT}$, $$\mathfrak{S}_j^{FLUT} = \max(\alpha \times \max(\{|\tilde{T}_j^F(b) - \tilde{T}_{j-1}^F(b)| \forall b\}), \beta),$$

wherein $\alpha$ and $\beta$ are constants.

EEE 7. The method of EEE 6, wherein for a secondary scene $P_{g-1}$ starting at frame $C_{g-1}$ and a secondary scene $P_g$ starting at frame $C_g$, performing the one or more boundary violation checks between the two scenes comprises:
testing if $$|\Delta_{C_g}| > |\mathfrak{S}_{C_g}^{DC}| + \omega,$$

is true, and if true, declaring a boundary violation, wherein $\omega$ is a constant, and $$\Delta_{C_g} = \lambda_{C_g} - \lambda_{C_g - 1},$$

wherein, for frame j within the scene $P_q$ $$\lambda_j = \frac{1}{H \times W} \sum_b \tilde{T}_{P_g}^F(b) \times h_j^v(b), \forall j \in [C_g, C_{g+1} - 1],$$

and $\bar{T}_{P_g}^F(b)$ denotes an average of frame-based forward reshaping functions in the secondary scene $P_g$ and neighbor secondary scenes.

EEE 8. The method of EEE 7, wherein $$\bar{T}_{P_g}^F(b) = \frac{1}{\Theta'' - \Theta' + 1} \sum_{j=\Theta'}^{\Theta''} \tilde{T}_j^F(b),$$

$$\Theta' = \max(C_0, C_g - \theta),$$

$$\Theta'' = \min(C_{L-1}, C_{g+1} - 1 + \theta),$$

$\theta$ is an integer constant denoting a frame overlap between two subscenes, and $C_0$ and $C_{L-1}$ denote the first and last frame in the first video sequence.

EEE 9. The method of EEE 7 or EEE 8, further comprising testing if $$\text{sign}(\Delta_{C_g}) \neq \text{sign}(\mathfrak{S}_{C_g}^{DC})$$

is true, and if true declaring a boundary violation, wherein for a real number x, sign(x) returns 0 of x=0, 1, if x>0, and −1 if x<0.

EEE 10. The method of any of EEEs 7-9, further comprising testing if $$\max(\{|\tilde{T}_{P_g}^F(b) - \tilde{T}_{P_{g-1}}^F(b)| \| \forall b\}) > \mathfrak{S}_{C_g}^{FLUT}$$

is true, and if true, declaring a boundary violation.

EEE 11. The method of any of EEEs 1-10, wherein generating scene-based forward reshaping functions based on the second set of scenes further comprises:
if a scene in the second set of scenes is a primary scene, then generating a scene-based forward reshaping function for the scene based only on statistical data generated from frames within the scene; else
if a scene in the second set of scenes is a secondary scene, then generating the scene-based forward reshaping function for the scene based on statistics from frames in the scene and frames from neighboring secondary scenes.

EEE 12. The method of EEE 11, further comprising:
generating scene-based backward reshaping functions based on the output video sequence, the first video sequence, and the scene-based forward reshaping functions;
generating metadata based on parameters of the scene-based backward reshaping functions; and
outputting an output bitstream comprising the coded bitstream and the metadata.

EEE 13. A non-transitory computer-readable storage medium having stored thereon computer-executable instructions for executing with one or more processors a method in accordance with any one of the EEEs 1-12.

EEE 14. An apparatus comprising a processor and configured to perform any one of the methods recited in EEEs 1-12.

The invention claimed is:

1. A method for segmenting a video segment into scenes using a cloud-based system for encoding high dynamic range video, the method comprising:
receiving in a current computing node of the cloud-based system a first video sequence comprising video frames in a high dynamic range;
generating for each video frame in the first video sequence a frame-based forward reshaping function mapping the video frame from the high dynamic range to a second dynamic range lower than the high dynamic range;
generating, using a set of scene cuts for the first video sequence, a set of primary scenes for the first video sequence;
generating a second set of scenes for the first video sequence based on the set of primary scenes, wherein a primary scene belonging to a parent scene with video frames to be coded across the current computing node and a neighbor computing node of the cloud-based system is divided into secondary scenes, wherein, given a primary scene, generating a list of secondary scenes for the primary scene comprises:
initializing a set of secondary scenes and a set of violation scenes based on the set of primary scenes; and
generating one or more sets of smoothness thresholds based on the frame-based forward reshaping functions, wherein generating the one or more smoothness thresholds comprises computing a first set of smoothness thresholds $\mathfrak{S}_j^{DC}$ for each frame i in the first video sequence, $$\mathfrak{S}_j^{DC} = \chi_j - \chi_{j-1},$$

wherein $$\chi_j = 1/H \times W \sum_b \tilde{T}_P^F(b) \times h_j^v(b),$$

wherein $\tilde{T}_j^F(b)$ denotes a frame-based forward reshaping function for frame-j in the first video sequence as a function of input codewords b, $h_j^v(b)$ denotes a histogram of the j-th frame in the first video sequence, and H and W denote width and height values for the frames in the first video sequence;

generating for each scene in the second set of scenes a scene-based forward reshaping function mapping the video frames in the scene from the high dynamic range to the second dynamic range;

applying the scene-based forward reshaping functions to the video frames in the first video sequence to generate an output video sequence comprising video frames in the second dynamic range; and compressing the output video sequence to generate a coded bitstream.

2. The method of claim 1, wherein, given a primary scene, generating a list of secondary scenes for the primary scene further comprises:
repeating until there are no boundary violations:
  dividing each scene in the set of violation scenes into two new subscenes;
  generating an updated set of violation scenes with an empty set;
  generating an updated set of secondary scenes by adding the two new subscenes to the set of secondary scenes;
  performing one or more boundary violation checks in the set of secondary scenes using the one or more sets of smoothness thresholds; and
  if there is at least one boundary violation between two subscenes in the set of secondary scenes, then adding the two subscenes to the set of violation scenes and continuing subdividing the primary scene with the updated set of violation scenes and the updated set of secondary scenes;
  else, signaling there are no boundary violations and outputting the list of secondary scenes.

3. The method of claim 1, wherein generating, using a set of scene cuts for the first video sequence, a set of primary scenes comprises:
  accessing a first set of scene cuts for the first video sequence from a file;
  generating a second set of scene cuts for the first video sequence using an automatic scene-change detector;
  generating a final set of scene cuts based on an intersection of the first set of scene cuts and the second set of scene cuts; and
  generating the set of primary scenes using the final set of scene cuts.

4. The method of claim 1, wherein given a scene $P_g$ in the set of violation scenes, the scene is split in frame location $C_S$, wherein:
  if the scene $P_g$ comprises a primary scene which is part of a parent scene with frames to be processed in a computing node of the cloud-based system prior to the current computing node, then $$C_S = C_0 + B,$$

wherein, $C_0$ denotes the first frame in the first video sequence and B denotes a number of bumper frames shared by two neighboring computing nodes of the cloud-based system;
  else, if the scene $P_g$ comprises a primary scene which is part of a parent scene with frames to be processed in a computing node of the cloud-based system subsequent to the current computing node, then $$C_S = C_{L-1} - B,$$

wherein $C_{L-1}$ denotes the last frame in the first video sequence;
  else, if the scene $P_g$ comprises a secondary scene $$C_s = \min_j \sum_b \left| \hat{T}_{P_g}^F(b) - \tilde{T}_j^F(b) \right|,$$

wherein $\tilde{T}_j^F(b)$ denotes a frame-based forward reshaping function for frame-j in the first video sequence as a function of input codewords b, and $\hat{T}_{P_g}^F(b)$ denotes an average of frame-based forward reshaping functions for frames related to the scene $P_g$.

5. The method of claim 1, further comprising computing a second set of smoothness thresholds $\Im_j^{FLUT}$, $$\Im_j^{FLUT} = \max(\alpha \times \max(\{|\tilde{T}_j^F(b) - \tilde{T}_{j-1}^F(b)| \| \forall b\}), \beta),$$

wherein $\alpha$ and $\beta$ are constants.

6. The method of claim 5, wherein for a secondary scene $P_{g-1}$ starting at frame $C_{g-1}$ and a secondary scene $P_g$ starting at frame $C_g$, performing the one or more boundary violation checks between the two scenes comprises:
testing if $$|\Delta_{C_g}| > |\Im_{C_g}^{DC}| + \omega$$

is true, and if true, declaring a boundary violation, wherein w is a constant, and $$\Delta_{C_g} = \lambda_{C_g} - \lambda_{C_g - 1},$$

wherein, for frame j within the scene $P_g$ $$\lambda_j = \frac{1}{H \times W} \sum_b \hat{T}_{P_g}^F(b) \times h_j^v(b), \; \forall \; j \in [C_g, C_{g+1} - 1],$$

and $\tilde{T}\_(P\_g)^F(b)$ denotes an average of frame-based forward reshaping functions in the secondary scene $P_g$ and neighbor secondary scenes.

7. The method of claim 6, wherein $$\hat{T}_{P_g}^F(b) = \frac{1}{\Theta'' - \Theta' + 1} \sum_{j=\Theta'}^{\Theta''} \tilde{T}_j^F(b),$$

$$\Theta' = \max(C_0, C_g - \theta),$$

$$\Theta'' = \min(C_{L-1}, C_{g+1} - 1 + \theta),$$

$\theta$ is an integer constant denoting a frame overlap between two subscenes, and $C_0$ and $C_{L-1}$ denote the first and last frame in the first video sequence.

8. The method of claim 6, further comprising testing if $$\text{sign}(\Delta_{C_g}) \neq \text{sign}(\Im_{C_g}^{DC})$$

is true, and if true declaring a boundary violation, wherein for a real number x, sign (x) returns 0 of x=0, 1, if x>0, and −1 if x<0.

9. The method of claim 6, further comprising testing if $$\max(\{|\tilde{T}\_(P\_g)^F(b) - \tilde{T}\_(P\_(g-1))^F(b)| \| \forall b\}) > \Im\_(C\_g)^{FLUT}$$

is true, and if true, declaring a boundary violation.

10. The method of claim 1, wherein generating for each scene in the second set of scenes a scene-based forward reshaping function comprises:
- if a scene in the second set of scenes is a primary scene, then generating the scene-based forward reshaping function for the scene based only on statistical data generated from frames within the scene; else
- if a scene in the second set of scenes is a secondary scene, then generating the scene-based forward reshaping function for the scene based on statistics from frames in the scene and frames from neighboring secondary scenes.

11. The method of claim 10, further comprising:
- generating scene-based backward reshaping functions based on the output video sequence, the first video sequence, and the scene-based forward reshaping functions;
- generating metadata based on parameters of the scene-based backward reshaping functions; and
- outputting an output bitstream comprising the coded bitstream and the metadata.

12. A non-transitory computer-readable storage medium having stored thereon computer-executable instructions for executing with one or more processors a method in accordance with claim 1.

13. An apparatus comprising a processor and configured to perform the method recited in claim 1.

* * * * *